United States Patent [19]
Litke et al.

[11] Patent Number: 6,003,925
[45] Date of Patent: Dec. 21, 1999

[54] OVERHEAD CONSOLE WITH DROP-DOWN DOOR

[75] Inventors: Mark R. Litke, Holland; John Rickfelder, Grand Haven; Paul M. Andary, Holland, all of Mich.

[73] Assignee: Lear Donnelly Overhead Systems, L.L.C., Southfield, Mich.

[21] Appl. No.: 08/804,354

[22] Filed: Feb. 21, 1997

Related U.S. Application Data

[60] Provisional application No. 60/012,088, Feb. 22, 1996, and provisional application No. 60/034,375, Dec. 26, 1996.

[51] Int. Cl.$^6$ ........................................................ B60R 5/00
[52] U.S. Cl. .......................... 296/37.8; 296/37.7; 16/319; 16/335; 16/337; 49/386; 220/324; 220/335
[58] Field of Search .................................. 296/37.1, 37.7, 296/37.8, 37.9, 37.12; 16/319, 335, 337; 49/138, 386, 387; 220/335, 324, 326, 337; 267/134, 153, 158; 200/61.62, 330, 331, 338

[56] References Cited

U.S. PATENT DOCUMENTS

| | | | |
|---|---|---|---|
| 4,114,236 | 9/1978 | Vandervort | 16/335 |
| 4,469,365 | 9/1984 | Marcus et al. | . |
| 4,775,768 | 10/1988 | Kanbar | 20/61.62 X |
| 4,867,498 | 9/1989 | Delphia et al. | . |
| 4,993,772 | 2/1991 | Charen | 16/341 X |
| 5,030,845 | 7/1991 | Falcoff et al. | . |
| 5,039,153 | 8/1991 | Lindberg et al. | . |
| 5,050,922 | 9/1991 | Falcoff | . |
| 5,064,974 | 11/1991 | Vigneau et al. | . |
| 5,331,518 | 7/1994 | Roark et al. | . |
| 5,388,880 | 2/1995 | Kinane | 296/37.8 X |
| 5,403,058 | 4/1995 | Fischer | . |
| 5,413,317 | 5/1995 | Spoerre | . |
| 5,516,177 | 5/1996 | Levely | . |
| 5,522,638 | 6/1996 | Falcoff et al. | . |
| 5,604,956 | 2/1997 | Grass | 16/335 X |

*Primary Examiner*—D. Glenn Daydan
*Assistant Examiner*—Chad D. Wells
*Attorney, Agent, or Firm*—Brooks & Kushman P.C.

[57] ABSTRACT

An overhead console for a vehicle or the like includes a housing defining a transmitter storage compartment for a garage door opener and an opening for permitting access to the storage compartment. A door is pivotally mounted to the housing for movement between a closed position for covering the opening and an open position for exposing the interior of the compartment through the lower opening. A hinge assembly for pivotally mounting the door to the housing includes a pair of spaced cams integrally molded to the door and a pair of spaced spring arms integrally molded to the housing. The spring arms are engageable with the cams as the door moves toward the open position from the closed position to arrest the movement of the door at an intermediate position between the closed and open positions. The spring arms are engageable and deflectable by the cam to provide frictional resistance to movement of the door only from the intermediate position to the open position. The spring arm includes a first section for contacting the cam at the intermediate position and a second section connected to the first section for contacting cam at the open position for resisting movement of the door toward the closed position. A manually operable actuating member is mounted to the door for movement with respect thereto, and includes a plurality of sockets formed therein. A plurality of actuator pegs are provided, with each peg having a first end that is adapted for positioning in one of the sockets and a second end adapted for receiving the first end of another peg. With this arrangement, one of the actuator pegs can be inserted in one of the sockets that corresponds to a position of the transmitter switch within the compartment. The height of the actuator peg can be adjusted to contact the actuator switch by stacking further actuator pegs thereon until the combined height of the actuator pegs is equal to the distance between the actuating member and the transmitter switch, such that movement of the actuating member activates the transmitter.

13 Claims, 4 Drawing Sheets

OVERHEAD CONSOLE WITH DROP-DOWN DOOR

This application claims the benefit of U.S. Provisional Application No. 60/012,088 filed on Feb. 22, 1996 and U.S. Provisional Application No. 60/034,375 filed on Dec. 26, 1996.

BACKGROUND OF THE INVENTION

1. Field of the Invention

This invention relates to a drop-down door for a vehicle overhead console, and more particularly to an overhead console door with a hinge having a cam to control the movement of the door which opens under the influence of gravity.

2. Prior Art

In recent years, vehicles have included a variety of storage compartments for the convenient storage of relatively small items such as garage door openers, sunglasses, and the like. Many of these items are stored in overhead compartments which are centrally located in the roof area of the vehicle and which include doors that pivot downwardly when opened. In some cases, a compartment door may include a button accessible from the exterior thereof that engages with the button of a garage door opener located within the compartment when the door is closed. The compartments or doors may also include integral pockets for receiving other small personal items.

U.S. Pat. No. 5,050,922 to Falcoff, discloses an overhead console with a door pivotably attached to a console housing through an axle which has a wire spring wound therearound. The spring is said to bias the door to its open position or in the alternative, to damp the opening movement of the door under its own weight. A pin on the door is received within a groove in the console to guide the door during movement.

U.S. Pat. No. 4,469,365 to Marcus et al. describes an overhead console having a door pivotally attached thereto. The door has a compartment for storing items such as sunglasses therein. The door includes a pair of spaced hinges which have a flange secured along the top edge of the door, an arcuate segment, and a second flange pivotally attached to the arcuate segment through a pin and barrel arrangement.

U.S. Pat. No. 5,388,880 to Kinane relates to an overhead console for a vehicle having a console door. A button actuatable from outside the console is located on the door. The button has a peg for contacting an actuator on a garage door opener located within the console. The button is biased downwardly against the door by a leaf spring which also functions to hold the garage door opener in place.

U.S. Pat. No. 5,064,974 to Vigneau et al. relates to an overhead console having a garage door opener located therein. The garage door opener is mounted to a door of the console. The door has a button for actuating the garage door opener. A number of removable pins of varying length are integrally molded to a lever which mounts an actuating button. These pins are removable from the lever and fit within holes in the lever in alignment with an actuating button on the garage door opener. Typically, all pins are removed until the correct match is found. The remainder of the pins are then discarded and are unavailable in the event of a change in the garage door opener.

Although the above references are satisfactory for their intended purpose, they do not recognize the potential danger of opening the door when loose objects are located within the compartment. Objects that may have worked loose due to vibration or due to their careless placement within the compartment could fall when the door is opened causing distraction and/or injury to the vehicle's occupants. Door rattle is another common problem among the prior art when the compartment door is open. As the vehicle travels, any vibrations transmitted from the suspension to the body will subsequently be transferred to the open compartment door, again causing distraction to the operator and subsequent weakening of the door hinge mechanism. Some previous hinge mechanisms also require separate pieces with added cost or complicated structure which increase assembly time and manufacturing expense.

SUMMARY OF THE INVENTION

In accordance with the present invention, an overhead console, which may be used in an automotive vehicle, includes a door pivotably mounted to the console housing. The console defines a compartment for storing a garage door opener or other accessories.

According to one aspect of the invention, an overhead console for a vehicle or the like includes a housing defining a transmitter storage compartment for a garage door opener and an opening for permitting access to the storage compartment. A door is pivotally mounted to the housing for movement between a closed position for covering the opening and an open position for exposing the interior of the compartment through the opening. A hinge assembly for pivotally mounting the door to the housing includes a pair of spaced cams integrally molded to the door and a pair of spaced spring arms integrally molded to the housing. The spring arms are engageable with the cams as the door moves toward the open position from the closed position to arrest the movement of the door at an intermediate position between the closed and open positions. The spring arms are engageable and deflectable by the cam to provide frictional resistance to movement of the door only from the intermediate position to the open position. Each of the spring arms includes a first section for contacting the cam at the intermediate position and a second section connected to the first section for contacting cam at the open position for resisting movement of the door toward the closed position.

According to a further aspect of the invention, a manually operable actuating member is mounted to the door for movement with respect thereto, and includes a plurality of sockets formed therein. A plurality of actuator pegs are provided, with each peg having a first end that is adapted for positioning in one of the sockets and a second end adapted for receiving the first end of another peg. With this arrangement, one of the actuator pegs can be inserted in one of the sockets that corresponds to a position of the transmitter switch within the compartment. The height of the actuator peg can be adjusted to contact the actuator switch by stacking further actuator pegs thereon until the combined height of the actuator pegs is equal to the distance between the actuating member and the transmitter switch, such that movement of the actuating member activates the transmitter.

The console has a bezel with the spring arm which can be formed integrally therewith or otherwise attached thereto. The cam is integral with the door and is adapted to dampen the free fall of the door from the closed position to the open position. Initially, a latch holds the door closed against gravity. In this position, there is a clearance between the cam and spring arm to enable the door to fall approximately one-third open under the influence of gravity when the latch is released before the cam engages the spring arm. This brake prevents loose objects within the compartment from inadvertently falling from the console. A light downward force must then be applied to the door, thus overcoming the light spring pressure on the cam in order to fully open the door. When the door is fully open, the cam is in an overcenter position and in contact with the spring arm to maintain the door in the fully open position and to eliminate door rattle resulting from any vibrations transmitted from the vehicle body to the open compartment door. Subsequent weakening or wear of the door hinge mechanism is therefore impeded. In a preferred embodiment of the invention, the cam and spring arm are both integral parts of the door and bezel, respectively. A single integral cam structure can be located at a rear central portion of the door, and the spring arm can be located on the bezel in a corresponding location. Alternatively, a pair of integral cams can be spaced apart along the rear portion of the door, and two spring arms can be located on the bezel in corresponding locations to provide additional lateral support. The hinge mechanism of the present invention thus eliminates separate hinge pieces and complicated structure which would otherwise increase assembly time and manufacturing expense.

Further according to the invention, an overhead console for a vehicle has a door pivotably mounted to the console which defines a garage door opener compartment. The door has a button pivotably mounted to it for actuation of a garage door opener mounted to an upper surface of the compartment. The button has at least two integrally mounted sockets in an upper face of the button and further has at least two integrally molded actuator pegs also molded to the button. A thin frangible web separates the molded actuator pegs from the button. The actuator pegs have openings which are selectively mountable onto any of the molded sockets to provide an actuator finger for depressing an actuator switch in a garage door actuator. The actuator pegs have complementary pins and sockets so that the actuator pegs can be mounted one on top of the other as necessary to reach the depressible actuator switch of the garage door opener. Thus, the actuator pegs can be stacked end on end and mounted on any of the molded sockets to adapt the button to any type of garage door actuator. Preferably, the actuator pegs are of a different length to accommodate a still further range of garage door actuators. The actuator pegs are preferably molded to the button but can alternatively be molded to the door.

The integral molding of the pegs to the button forms the pegs and attaches them to the button in place for use. Thus, there is no additional labor for manufacture or mounting of the buttons. In one embodiment, peg sockets are integrally formed within the garage door opener compartment for storing unused pegs for future use after they have been separated from the button.

BRIEF DESCRIPTION OF THE DRAWINGS

These and other features, advantages, and objects of the present invention will become apparent upon reading the following description with reference to the accompanying drawings in which.

DETAILED DESCRIPTION OF THE PREFERRED EMBODIMENT

Figure 1:
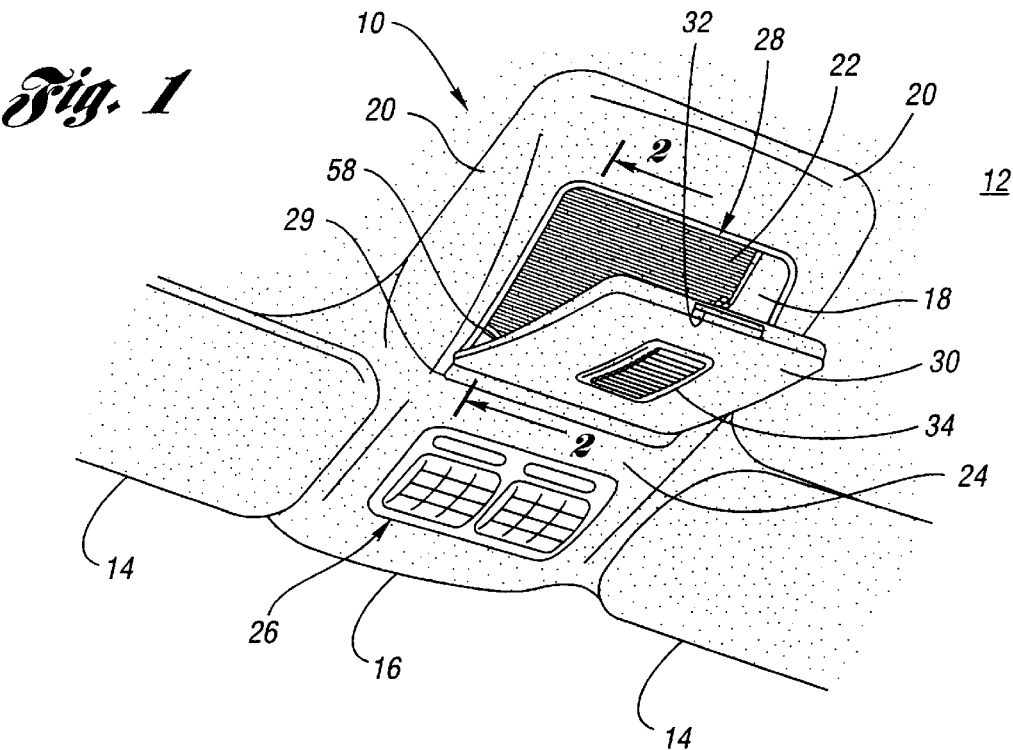
FIG. 1 is a perspective view of an overhead console with the door thereof shown in open position and incorporating the hinge mechanism of the present invention.
Figure 2:
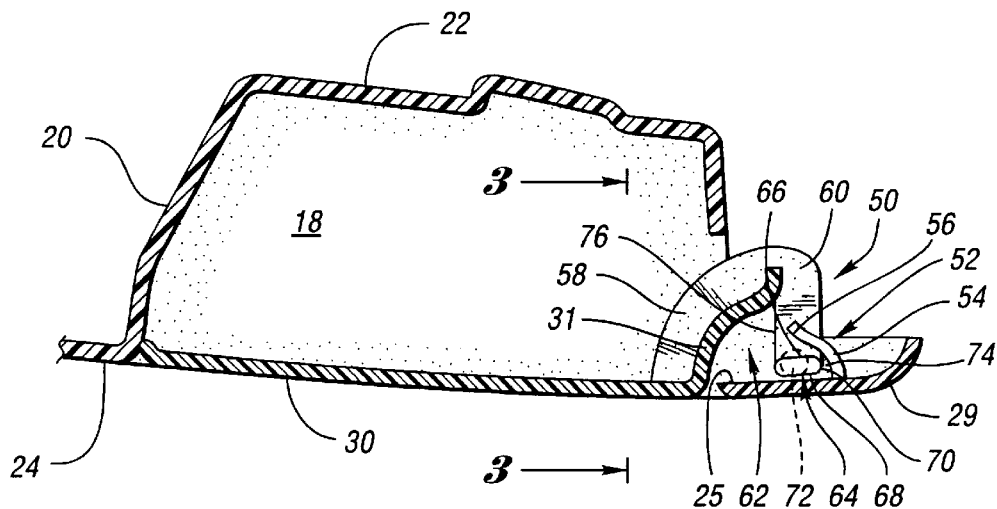
FIG. 2 is cross-sectional side view of the overhead console and hinge mechanism according to the present invention taken along line 2—2 of FIG. 1 showing the console door in the closed position.

Referring to FIGS. 1–2, the overhead console 10 is shown at the forward-most portion of an automobile ceiling or headliner 12. For reference purpose, the vehicle's sun visors 14 are shown in phantom line at the forward edge 16 of the vehicle roof. The overhead console 10 includes a storage compartment housing 18 defined by side walls 20, upper wall 22, and a lower wall 24 in which courtesy lights 26 or other accessories may be located. An opening 28 in lower wall 24 is sized to receive a door 30 for permitting access to the interior of the storage compartment housing 18 and may include a bezel 29 around its outer periphery. The preferred embodiment includes a bezel 29 as part of wall 24. A latch 32 is attached to the door and cooperates with a catch (not shown) in the console for releasably holding the door in the closed position. The door 30 may include a garage door button 34 for actuating a garage door opener (not shown) located inside the compartment when the button 34 is pressed.

Figure 3:
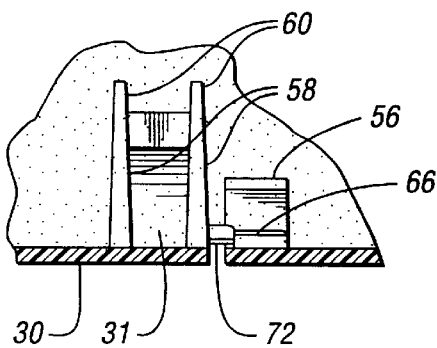
FIG. 3 is a cross-sectional view of the hinge mechanism taken along line 3—3 of FIG. 2.

Referring now to FIGS. 2–3, a hinge assembly 50 includes a spring arm 52 integrally formed or otherwise attached to the bezel 29 such that spring arm 52 projects toward the storage compartment housing 18. The spring arm 52 has a first curved portion 54 and an angled portion 56. The spring arm is preferably constructed of the same material as the bezel 29 and is dimensioned such that any force applied against the spring arm causes the arm to resiliently deflect, and to return to its original position when the force is removed. The hinge assembly 50 also includes a pair of curved sections 58 integrally attached to a curved section 31 of the door 30. An arm 60 extends downwardly from each curved section 58. Each curved section 58 and arm 60 project into the compartment and together with the door curved section 31 create a space 62 which permits the door to rotate with respect to the lower wall 24 and bezel 29. The curved sections 58 and arms 60 are preferably constructed of the same material as the door and are preferably integrally molded therewith. The preferred material is polypropylene although any suitably resilient moldable plastic can be used. A cam 64 is integral with the lower end of at least one of the arms 60 and projects laterally therefrom. The cam 64 has a first side 66, a second side 68, and an apex 70. A pivot rod 72 is attached to the lower end of the arm 60 for rotation in an aperture (not shown) in the console.

Figure 4:
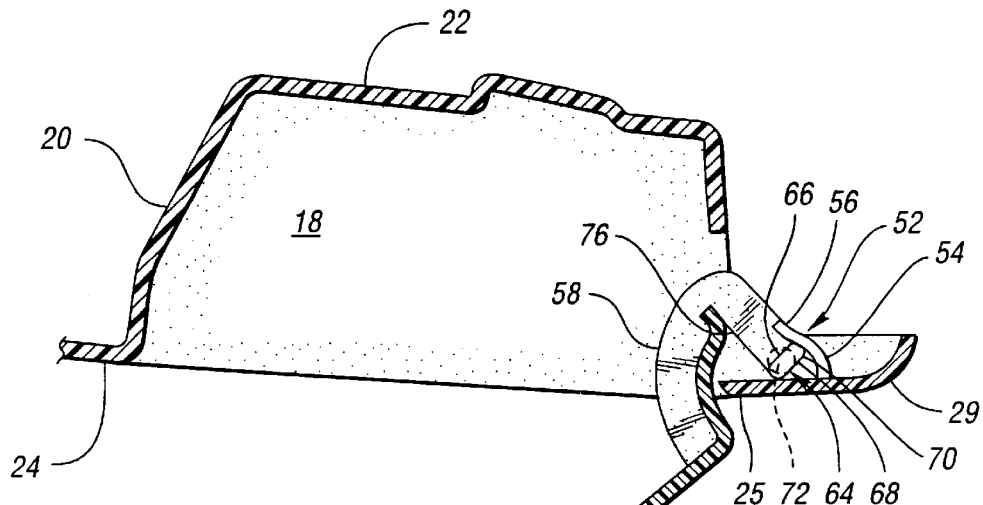
FIG. 4 is a cross-sectional view similar to FIG. 2 showing the console door slightly open and engaged with the spring arm of the bezel.
Figure 5:
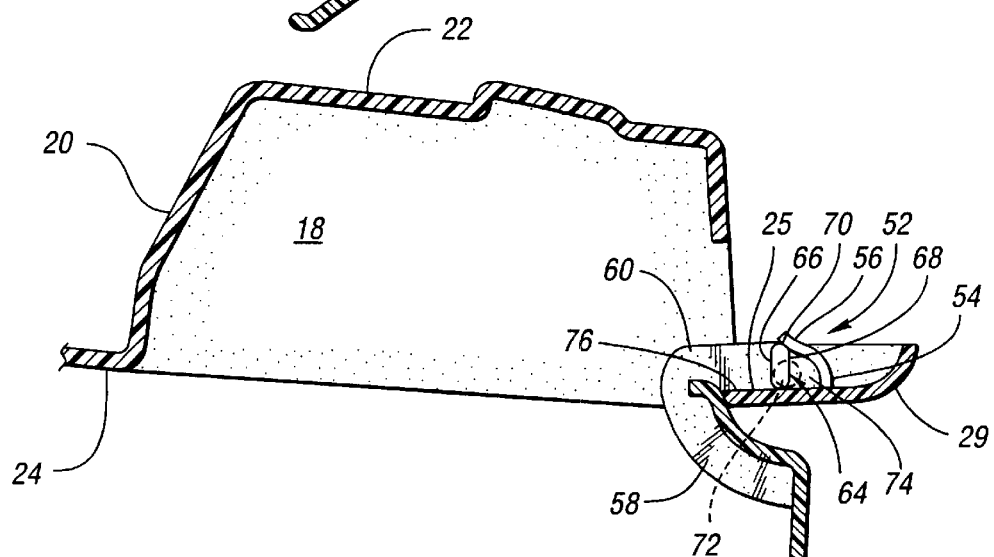
FIG. 5 is a cross-sectional view similar to FIG. 2 showing the console door in the fully open detent position.

Initially, the latch 32 holds the door closed against gravity. In this position, there is an initial clearance 74 between the cam 64 and spring arm 52. This clearance enables the door to fall open to an initial position under the influence of gravity when the latch is released. In the preferred embodiment, the initial position is one-third open, as shown in FIG. 4. In this position, the first side 66 of the cam 64 engages the curved portion 54 of the spring arm 52. The spring arm 52 offers sufficient resistance to the rotational moment of the door (and any objects located thereon) to completely stop its free fall. Slight pressure on the door in the direction of door swing by an operator causes the cam apex 70 to rotate against the spring arm curved portion 54, thereby deflecting the spring arm. The amount of pressure required to deflect the spring arm can be adjusted by varying the spring arm and cam dimensions. As the cam is further rotated, the apex 70 passes by the curved portion 54 permitting the angled portion 56 of the spring arm to press against the cam second side 68. This action causes the door to spring open until the inside surface 76 of arm 60 abuts against the inside surface 25 of bezel 29 to stop any further rotation, as shown in FIG. 5. The cam apex 70 is now held in an overcenter position by the spring arm, thus creating an open detent position for the door. The door may subsequently be closed by exerting slight upward pressure on the door to overcome the spring force. Once this spring force is overcome, the door will pivot easily to the closed position due to the clearance 74.

The clearance between the cam 64 and the spring arm 52 when the door is closed has the advantage of avoiding any deformation or relaxation of the spring during extreme conditions, for example, when the car is sitting in a desert in the summer. Because the spring is unstressed in the normal door closed position, it will not deform under extreme heat conditions.

Figure 6:
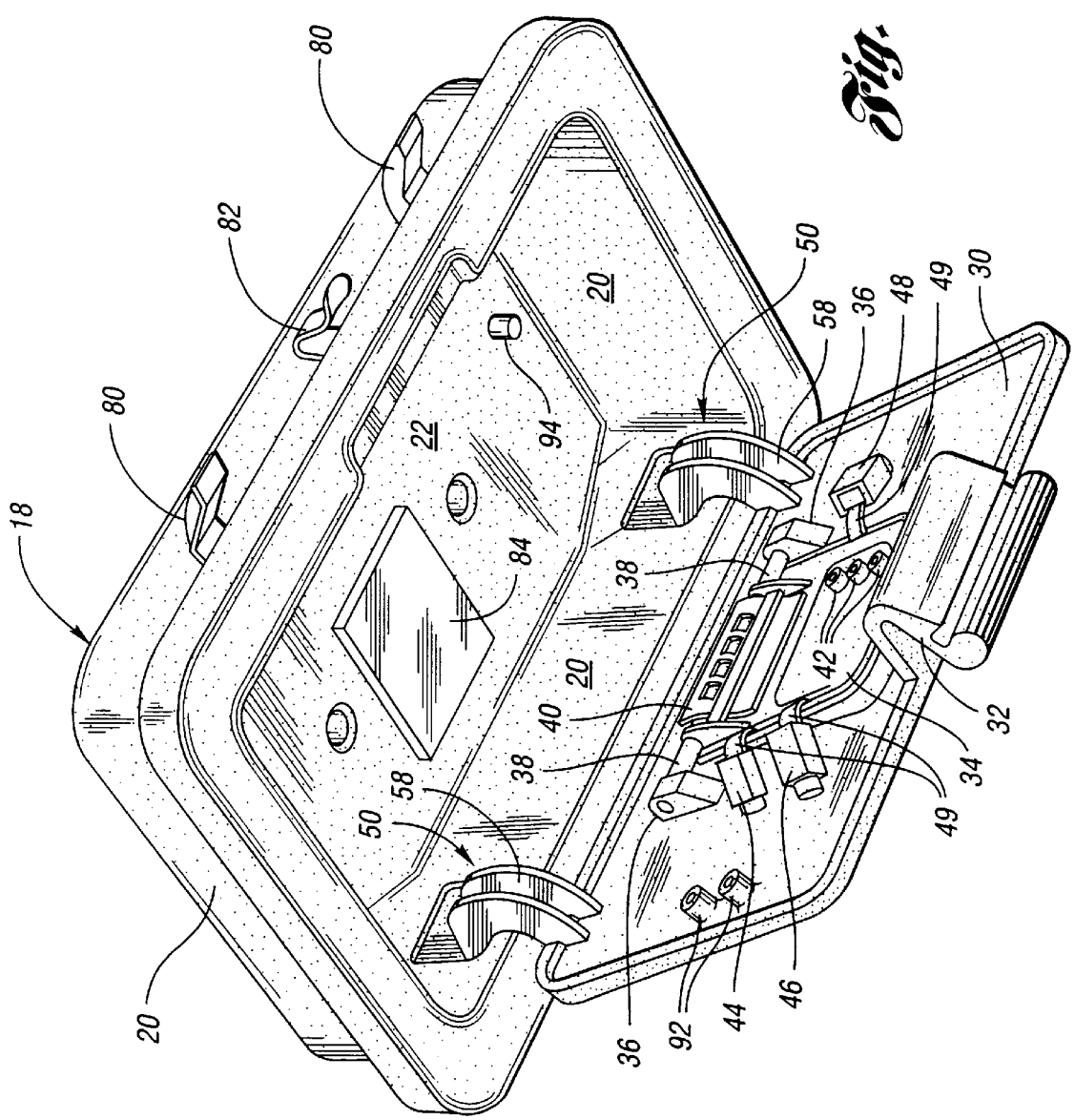
FIG. 6 is a perspective view of a garage door opener bin for use in an overhead console according to the invention.
Figure 7:
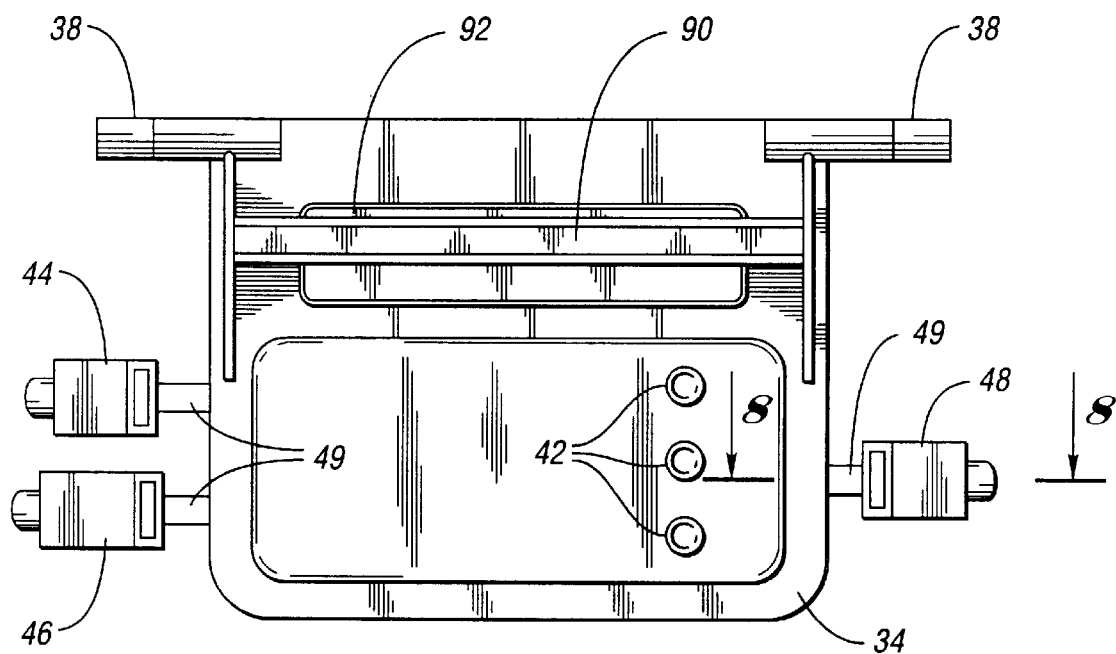
FIG. 7 is a plan view of the actuator button illustrated in FIG. 6.
Figure 8:
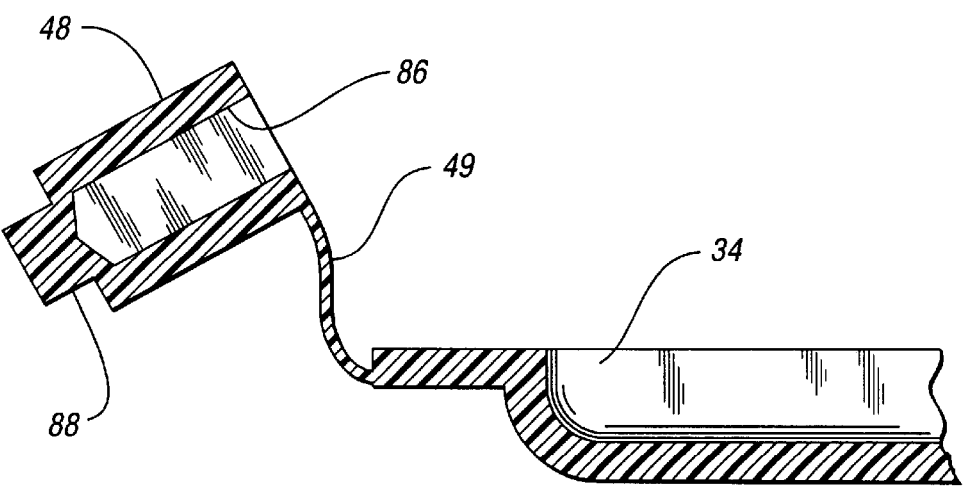
FIG. 8 is a sectional view taken along lines 8—8 of FIG. 7.

Referring now to FIGS. 6 and 8, there is shown a storage compartment housing 18 having side walls 20 and a door 30 pivotably mounted to one of the side walls 20 through a hinge assembly 50. The door 30 has a latch 32 for releasably retaining the door in a closed position (not shown) closing the openings defined by the walls 20. A garage door button 34 is pivotably mounted to the door 30 through pins 38 which are journaled in holes in support flanges 36. The door 30 has integrally molded thereto support flanges 36 with holes therethrough for receiving the pins 38 of the button 34. A spring 40 is mounted between the door 30 and the button 34 to bias the button 34 against the door 30 in a closed position over an opening in the door 30. As illustrated in FIG. 7, the door 30 has integrally molded thereto a bar and an opening 92 beneath the bar 90. The spring 40 is mounted between the bar 90 and the opening 92 and is releasably retained therein. The spring 40 also extends beyond the end of the button 34 and contacts the door 30 to bias the button 34 against the door 30.

The button 34 has integrally molded thereto one or more actuator pegs 44, 46 and 48 which are connected to the button 34 through webs 49. These pegs are intended to be removed by the vehicle owner by means of a twisting motion which will break the weak web 49. Each of the pegs has a partial bore 86 as illustrated in FIG. 8 and has a pin 88 projecting from one end thereof. Three molded sockets are integrally molded onto the inside face of the button 34. The actuator pegs 44, 46 and 48 are of different lengths. Each of the actuator pegs 44, 46 and 48 is adapted to be selectively mounted on any of the molded sockets 42. Further, the actuator pegs 44, 46 and 48 are adapted to be mounted in end-to-end relationship with each other with the pin 88 of one of the actuator pegs being received in the partial bore 86 of another actuator peg. The different lengths of the pegs 44, 46 and 48 and the stackability of the pegs, coupled with the multiple sockets 42, provide flexibility in aligning the actuator button 34 with a depressible actuator switch in a garage door opener.

Sockets 92 are molded into the door 30 to receive and retain any unused pegs 44, 46 or 48 when not in use on the pegs 42. Typically, all pegs 44, 46 and 48 are detached from the button during an initial garage door installation. When the proper peg is selected, the other peg or pegs can be mounted on the sockets 92 for use in the future, if necessary. The peg storage sockets can be integrally formed anywhere in the garage door compartment. For example, storage socket 94 can be formed on upper wall 22.

A hook-and-loop pad 84 is mounted to the upper wall 22 for mounting a garage door actuator within the storage compartment housing 18. The hook-and-loop pad 84 comprises a strip of hook material (or loop material) mounted to the upper wall 22 and a strip of loop material (or hook material) with an adhesive backing which is adapted to be mounted to a face of the garage door actuator. The garage door actuator thus can be positioned with the hook and loop material in a predetermined location within the storage compartment housing 18 for actuation of a garage door of the automobile owner in which the storage compartment housing 18 is mounted. Each garage door actuator has a depressible actuator switch which emits an electromagnetic signal to open or close a garage door. The depressible switch faces toward the door 30 and is aligned with one of the molded sockets 42. One or more of the pegs is mounted on one of the sockets 42 in alignment with the depressible switch on the garage door actuator. Since the garage door opener is movable in a fore and aft position and in a side to side direction, it can be easily aligned with the molded sockets 42. Further, because the actuator pegs 44, 46 and 48 are of different lengths and can be selectively mounted on any one of the molded sockets 42 and further because the pegs are stackable on each other, the actuator pegs can be easily aligned with the depressible switch on the garage door opener.

While the invention has been described with reference to its preferred embodiment, it will be understood by those skilled in the art that various changes may be made. For example, the spring arm can be directly attached to the lower wall of the console instead of the bezel. The spring arm can also be positioned on the door 30 and the cam can be positioned on the bezel or lower wall of the console. The spring arm and cam can be formed integrally to their respective supporting structure or can be attached through adhesives, screws, or other well known means.

The embodiments of the invention in which an exclusive property or privilege is claimed are defined as follows:

1. An overhead console for a vehicle, the overhead console comprising:
    a housing having walls defining a storage compartment and a lower opening therein;
    a door pivotally mounted to the housing for movement between a closed position for covering the opening and an open position for exposing the interior of the compartment through the lower opening;
    a hinge assembly for pivotally mounting the door to the housing, the hinge assembly comprising:
        at least one cam positioned on one of the door and housing; and
        at least one spring arm positioned on the other of the door and housing, the spring arm being engageable with the cam as the door moves toward the open position from the closed position to arrest the movement of the door at an intermediate position between the closed and open positions, the spring arm being engageable and deflectable by the cam to provide frictional resistance to movement of the door only from the intermediate position to the open position;
    wherein the cam is positioned on the door, and the spring arm is positioned on the housing;

wherein the housing further includes a bezel at a lower end thereof, the spring arm being integrally formed with the bezel; and at least one curved hinge leg attached at one end thereof to the door, a free end of the hinge leg having a pivot member and the housing having a cooperating pivot member for pivotally mounting the door to the housing.

2. An overhead console according to claim 1 wherein the spring arm has a first section for contacting the cam at the intermediate position and a second section connected to the first section for contacting the cam at the open position for resisting movement of the door toward the closed position.

3. An overhead console according to claim 1 wherein the cam is integrally molded to the free end of the hinge leg in proximity to the hinge leg pivot member.

4. An overhead console according to claim 1 and further comprising:

a manually operable actuating member mounted to the door for movement with respect thereto, the actuating member including an interior surface and a plurality of sockets formed therein;

a plurality of actuator pegs, each peg having a first end that is adapted for positioning in one of the sockets and a second end adapted for receiving the first end of another peg;

wherein one of the actuator pegs can be inserted in one of the sockets that corresponds to a position of a transmitter switch within the compartment, and wherein the height of the one actuator peg can be adjusted to contact the transmitter switch by stacking at least one further actuator peg on the one actuator peg, such that movement of the actuating member activates a transmitter associated with the transmitter switch.

5. An overhead console according to claim 4 wherein each actuator peg is integrally molded to the actuating member through a frangible web.

6. An overhead console according to claim 4 and further comprising at least one storage socket integrally molded in the door upper surface for storing a remainder of the actuator pegs.

7. An overhead console according to claim 6 and further comprising a second storage socket integrally molded in at least one of the walls of the housing.

8. An overhead console for a vehicle for storing a transmitter having a switch for selectively activating the transmitter, the overhead console comprising:

a housing having walls defining a storage compartment for the transmitter and a lower opening therein;

a door pivotally mounted to the housing for movement between a closed position for covering the opening and an open position for exposing the interior of the compartment through the lower opening;

a manually operable actuating member mounted to the door for movement with respect thereto, the actuating member including an interior surface and a plurality of sockets formed therein;

a plurality of actuator pegs, each peg having a first end that is adapted for positioning in one of the sockets and a second end adapted for receiving the first end of another peg;

wherein one of the actuator pegs can be inserted in one of the sockets that corresponds to a position of the transmitter switch within the compartment, and wherein the height of the one actuator peg can be adjusted to contact the transmitter switch by stacking at least one further actuator peg on the one actuator peg, such that movement of the actuating member activates the transmitter.

9. An overhead console according to claim 8 wherein each actuator peg is integrally molded to the actuating member through a frangible web.

10. An overhead console according to claim 8 and further comprising at least one storage socket integrally molded in the door upper surface for storing a remainder of the actuator pegs.

11. An overhead console according to claim 10 and further comprising a second storage socket integrally molded in at least one of the walls of the housing.

12. An overhead console according to claim 8 and further comprising at least one storage socket integrally molded in at least one of the walls of the housing for storing a remainder of the actuator pegs.

13. An overhead console according to claim 8 wherein the actuator member is pivotally mounted to the door and a spring biases the actuator member outwardly of the console interior.

* * * * *